US008234771B2

(12) United States Patent
Farooqui

(10) Patent No.: US 8,234,771 B2
(45) Date of Patent: Aug. 7, 2012

(54) METHOD AND SYSTEM FOR MACHINING AN ARRAY OF COMPONENTS

(75) Inventor: Asghar Ali Farooqui, Karnataka (IN)

(73) Assignee: General Electric Company, Schenectady, NY (US)

( * ) Notice: Subject to any disclaimer, the term of this patent is extended or adjusted under 35 U.S.C. 154(b) by 1476 days.

(21) Appl. No.: 11/689,303

(22) Filed: Mar. 21, 2007

(65) Prior Publication Data

US 2008/0230971 A1  Sep. 25, 2008

(51) Int. Cl.
*B23P 13/04* (2006.01)

(52) U.S. Cl. ............ 29/557; 29/558; 409/243; 409/244; 409/257; 409/258; 409/271; 409/276; 409/278; 409/279; 269/104

(58) Field of Classification Search ............ 29/557, 29/558; 269/104; 409/243, 244, 258, 257, 409/271, 276, 278, 279, 43
See application file for complete search history.

(56) References Cited

U.S. PATENT DOCUMENTS

| | | | | |
|---|---|---|---|---|
| 4,419,803 A * | 12/1983 | Thornton et al. | | 29/428 |
| 4,531,270 A * | 7/1985 | Griffith et al. | | 29/889.7 |
| 4,701,085 A * | 10/1987 | Kuroiwa et al. | | 409/244 |
| 4,810,140 A * | 3/1989 | Copen | | 409/259 |
| 5,167,603 A * | 12/1992 | Iwaniuk et al. | | 483/28 |
| 5,435,676 A * | 7/1995 | Yera et al. | | 409/244 |
| 5,478,180 A * | 12/1995 | Hazama | | 409/287 |
| 5,615,467 A * | 4/1997 | Simmons et al. | | 29/27 C |
| 5,711,058 A * | 1/1998 | Frey | | 29/25.35 |
| 6,289,589 B1 * | 9/2001 | Aubele | | 29/898.047 |
| 6,701,768 B2 * | 3/2004 | Ling et al. | | 72/356 |
| 6,824,343 B2 * | 11/2004 | Kurita et al. | | 414/217 |
| 7,021,874 B2 * | 4/2006 | Shimasaku et al. | | 409/287 |
| 7,036,227 B2 * | 5/2006 | Ling et al. | | 29/893.33 |
| 7,135,809 B2 * | 11/2006 | Ossmann | | 310/335 |
| 7,278,806 B1 * | 10/2007 | Clayton | | 409/140 |
| 7,307,374 B2 * | 12/2007 | Ossmann | | 310/335 |
| 7,681,300 B2 * | 3/2010 | Thompson et al. | | 29/557 |
| 2005/0173090 A1 * | 8/2005 | Ling et al. | | 164/35 |

* cited by examiner

*Primary Examiner* — David Bryant
*Assistant Examiner* — Bayan Salone
(74) *Attorney, Agent, or Firm* — The Small Patent Law Group; Dean D. Small

(57) ABSTRACT

The invention provides an enhanced method and system for machining an array of components. A holding mechanism is provided for holding an array of components in a machining process. The holding mechanism comprises: a rigid base plate and at least one support for holding a raw material while machining, one end of each support being coupled to the rigid base plate. The holding mechanism is further provided with a secure plate movably coupled to the rigid base plate. The secure plate is provided with one or more holding parts such as double-sided tape or guiding pins for holding the raw material. The secure plate can be elevated to hold the raw material during a machining operation such as peripheral machining.

10 Claims, 6 Drawing Sheets ing small dimensions may be machined even though generally the CNC machines are large in size. To optimize the productivity of the CNC machines, gang-milling techniques are used, so that several small components are machined out from a large size raw material. Generally each component is mechanically secured before completely parting from raw material.

METHOD AND SYSTEM FOR MACHINING AN ARRAY OF COMPONENTS

FIELD OF THE INVENTION

This invention relates generally to machining process, and more particularly relates to a system and method for enhanced machining using machine tools.

BACKGROUND OF THE INVENTION

In machining process using Computer Numerical Control ("CNC") machines, a large number of components each having small dimensions may be machined even though generally the CNC machines are large in size. To optimize the productivity of the CNC machines, gang-milling techniques are used, so that several small components are machined out from a large size raw material. Generally each component is mechanically secured before completely parting from raw material.

Referring to a conventional machining process using a CNC machine for manufacturing an array case for an ultrasound probe, a raw material in billet form is cut into smaller pieces to form components having the required component size with just grinding tolerance. The components are grounded all around and then placed in a fixture specially designed to hold particular components in a specific way. The whole fixture with a plurality of components is then placed on a CNC bed. The machining then takes place by taking one reference for the entire set of components. The tolerances on individual components are achieved from the fixture tolerances and the securing accuracy.

Further while machining array cases for ultrasound probes, each component is clamped axially, which may cause stressing of the components. The components have a thickness in the range of 1 mm, and hence the clamping may result in cracking or breaking of the components. As there is a broaching requirement to remove the material inside the component, the bottom of the raw material also needs to be free for the broaching tool to cross over the component. For a broaching operation, the component needs to be held rigidly about 20 mm above a fixed base. It will be difficult to hold the component in air without any bottom support, as the wall thickness of the component will be in the order of 1 mm.

Thus in a manufacturing process using CNC machines, the components undergo various machining processes like pocket milling, periphery milling, Broaching, step milling, parting etc. Different operations may be performed by different tools and the position and alignment of the raw material need to be changed according to the design and operation of the tools. This will result in a time consuming process and will affect the productivity of the CNC machine. Dedicated fixtures are used for holding each of the components and this will be expensive in the event of large production. Further, the tolerance of the components is dependent on the fixture tolerance and operator performance.

Thus there exists a need to provide a mechanism for holding the components while machining the components using CNC machines and also an enhanced machining process to manufacture an array of components.

SUMMARY OF THE INVENTION

The above-mentioned shortcomings, disadvantages and problems are addressed herein which will be understood by reading and understanding the following specification.

The present invention provides a holding mechanism for holding an array of components in a machining process. The holding mechanism includes: (a) a rigid base plate; (b) at least one support for holding a raw material while machining, one end of each support being coupled to the rigid base plate; and (c) a secure plate movably coupled to the rigid base plate. The secure plate is provided with one or more holding part for holding the raw material, and is configured to be elevated to hold the raw material during a first machining operation. In an embodiment, the holding part includes: a double-sided foam tape, one side of the tape being attached to a rigid surface of the secure plate and the other side of the tape being attachable to the raw material during the first machining operation. in another embodiment, the holding part further includes a plurality of guiding pins provided on the secure plate, the guiding pins configured to be inserted into the components for holding the components while the components undergo the first machining operation. The first machining operation, in one embodiment, is peripheral machining.

In another embodiment, a process of machining an array of components is disclosed. The process includes the steps of: (a) holding a raw material using a support; (b) machining the raw material for providing a plurality of components; the components being provided with a plurality of lips for attaching the components to the raw material; (c) supporting the plurality of components using a secure plate, the secure plate being provided with a holding part for supporting the components; and (d) removing the plurality of lips attached to the components. In an embodiment the removing of the raw material from the corners of the inner cavity is achieved by using a broaching tool associated with a CNC machine.

In yet another embodiment, a process of manufacturing an array case for an ultrasound probe is provided. The process includes: (a) providing a raw material with a plurality of holes for accommodating a plurality of supports; (b) machining a plurality of components having an internal cavity and a plurality of lips, wherein the lips attach the components to the raw material; (c) removing the raw material on the corners of the internal cavity using a broaching process; (d) machining outer surface of the components, while the lips hold the components to the raw material; (e) elevating a vertically-moveable secure plate for holding the plurality of components, the secure plate being provided with at least one holding part; and (f) peripheral machining the raw material for removing the lips, the components being held by the secure plate during the peripheral machining.

Various other features, objects, and advantages of the invention will be made apparent to those skilled in the art from the accompanying drawings and detailed description thereof.

BRIEF DESCRIPTION OF THE DRAWINGS

A clear conception of the advantages and features constituting inventive arrangements, and of various construction and operational aspects of typical mechanisms provided by such arrangements, are readily apparent by referring to the following illustrative, exemplary, representative, and non-limiting figures, which form an integral part of this specification, in which like numerals generally designate the same elements in the several views, and in which.

DETAILED DESCRIPTION OF THE INVENTION

In the following detailed description, reference is made to the accompanying drawings that form a part hereof, and in which is shown by way of illustration specific embodiments that may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken as limiting the scope of the invention.

In various embodiments, a mechanism for holding components while machining the components using a CNC machine is disclosed. The holding mechanism allows the machining process to be completed without altering or changing the position of the raw material, through out the machining process using the CNC machine.

In another embodiment, the invention provides a process of machining an array of components. The machining process includes providing different types of support to the raw material. While machining, the raw material is supported with a plurality of supports and once the components are defined, the components are being supported by a plurality of lips. The lips support the components during broaching and surface machining. Finally, by peripheral machining, the lips are removed from the components, so that the individual components are separated from the raw material. While removing the lips the components are being held by a secure plate, which elevates while periphery machining so as to get attached to the bottom of the components.

In another embodiment, a process for manufacturing array cases is provided. In an example the array cases may be used in ultrasound probes. The method results in optimization of the CNC machines and increases the machining productivity.

While the present technique is described herein with reference to medical imaging applications and the machining of array cases for ultrasound imaging probes, it should be noted that the invention is not limited to this or any particular application or environment. Rather, the technique may be employed in a range of applications where a plurality of components need to be machined from a single large raw material.

Figure 1:
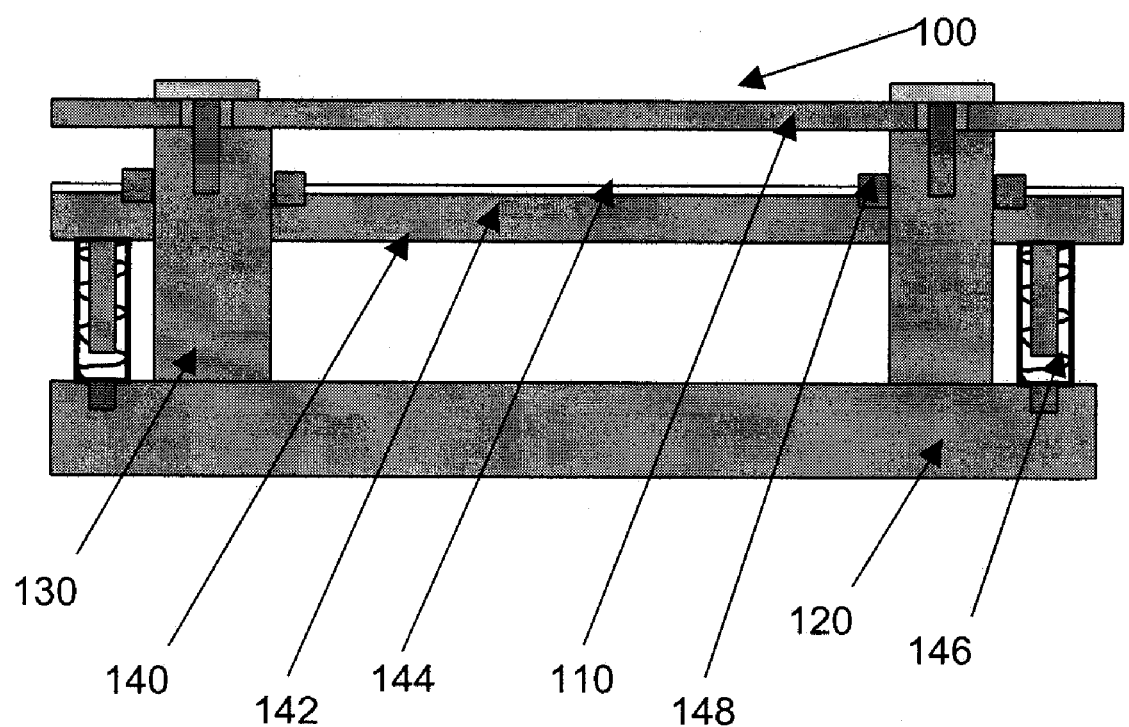
FIG. 1 is a side view of a holding mechanism as described in an embodiment of the invention.

FIG. 1 is a side view of a holding mechanism as described in an embodiment of the invention. The invention is explained with reference to a machining process used in manufacturing an array case, which could be used in an ultrasound probe. However the present holding mechanism may be used to hold a plurality of components in any machining process, especially machining using CNC machines. Generally, in machining using CNC machines, a large-sized raw material is used for producing a number of small-sized individual components from a single raw material. The raw material is generally sliced from a thick billet into required size. A component lay out may be defined on the raw material and components may be machined with required size and thickness. It may be further grounded to the required finish and tolerance. The raw material is generally provided with holes for accommodating supports for holding the raw material while machining. Normally the holding mechanism is selected first and accordingly holes are provided on the raw material. However it is possible to have a machined raw material and then design the holding mechanism accordingly.

As shown in FIG. 1, a holding mechanism 100 is provided for holding the raw material 10 in a machining process. The holding mechanism 100 is provided with a base plate 120, a plurality of supports 130, and a secure plate 140. Initially the raw material 110 is provided with sufficient holes selected for the machining process. The number of holes on the raw material and their position should be corresponding to the number of supports 130 required to hold the raw material 110 while machining. The precision and position of the holes in the raw material 110 should be in alignment with the supports 130. One end of each support 130 is coupled to the base plate 120. The base plate 120 is rigidly fixed and the whole holding mechanism is supported on the base plate 120. The base plate 120 is also provided with holes or projections (not shown) to accommodate the supports 130. Alternatively, the supports 130 are glued or otherwise affixed to the base plate 120. In an embodiment, a secure plate 140 is further provided with the base plate 120. One side of the secure plate is provided with a rigid surface 142 and the other end is provided with at least one holding part. In an embodiment, the holding part includes a double-sided foam tape 144. A person skilled in the art should understand that the double-sided foam tape 144 may be selected as the holding part because of its simplicity. However, any other similar holding parts may be used for that purpose. The secure plate 140 is movably coupled to the base plate 120 using a spring mechanism 146 comprising one or more springs (two springs are shown in FIG. 1). The spring mechanism 146 allows the secure plate 140 to be moved elevationally with respect to the base plate 120 and raw material 110, which allows the secure plate 140 to release and secure the raw material 110 easily. As could be understood, the spring mechanism 146 is used for simplicity and similar other mechanisms may be used for achieving the releasing and securing of the secure plate based on the design and concept of applications of the invention. The secure plate 140 is provided with holes 148 for accommodating the supports 130, such that the supports 130 pass through the holes 148 as the secure plate 140 is moved elevationally. The secure plate 140 is in lowered position while machining and is then raised during peripheral machining to hold the raw material 110.

Further the base plate 120 acts as a referencing edge to align the holding mechanism 100 with respect to the CNC machine axis. In an embodiment, the raw material 110 may be designed to layout a plurality of components and thus it requires having different types and number of holes or projections on the base plate 120 as well as on the raw materials 110. Different component layouts are designed in a single large raw material to machine a plurality of components in a single operation without the need to move the raw materials 110, thereby increasing the productivity of the machine.

The number of supports 130 and the corresponding holes in the base plate 120 and the raw material 110 depends on the component layout, component geometry, its rigidity, etc. Generally the supports 130 may be provided on the corners of the raw material 110. However it should not be limited so, as the support can be provided on any part of the raw material as per the rigidity and the design requirements. The structure and design of the supports may depend on the rigidity and stiffness required, which may further define the width and number of the supports required. Also different component layouts on the raw material may require re-arranging of the supports and corresponding changes in the alignment and design of secure plate. The holes in the secure plate are related to component layout design and support structure and its placement.

In one embodiment, the spring mechanism 146 which is used to couple the base plate 120 with the secure plate 140 is designed such that it supports dead weight of the secure plate 140 and facilitates in applying upward force on the raw material 110. In an embodiment the movement of the secure plate 140 is restricted only in vertical direction through the supports 130 in order to provide better alignment of the secure plate 140 with respect to the raw material 110. In a specific embodiment, the spring design is such that there is at least a uniform pressure distribution of about 1 kg/cm2 or as required across the complete raw material when released.

The secure plate 140 can be elevated using a cam or any other similar mechanism. The secure plate 140 is in the lowered position while machining and broaching and is released (i.e., raised elevationally) only during peripheral machining.

In a machining process, initially the raw material is supported by the supports. The number of supports and its design depends on the size of the raw material, component layout, rigidity requirement, etc. The raw material is machined to define components of desired size and thickness. The components are grounded further to achieve the desired finish and tolerance. Each component may include an internal cavity of desired thickness and may be achieved by broaching process. While broaching, the raw material is held by the supports. During machining in the component layout, the individual components are scaled. The plurality of components is provided with lips for supporting the components to the raw material during the machining process. Lips are elongated raw materials attached to the component for supporting the component on the raw material. The lips may be provided on one or more corners of the component. After the broaching, the components are subject to surface machining and at this time the raw material is supported by the supports and the components are held to the raw material by the lips. After surface machining, the secure plate is elevated by releasing the spring mechanism. The elevated secure plate secures to the raw material from the bottom. This act as a rigid support to the raw material. By periphery machining, the plurality of lips are removed from the components. While removing the plurality of lips, the components are held by the secure plate. In an example the components are stuck to the foam tape and after removing the lips, individual components can be plucked from the tape. Thus during the whole machining processes the raw material or components are held on the same position and this will contribute towards the accuracy and tolerance.

Figure 2:
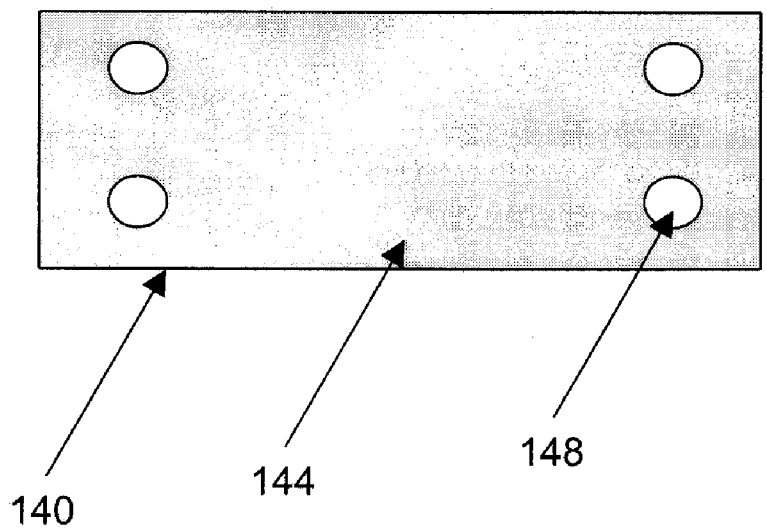
FIG. 2 is a top view of a secure plate used in the embodiment described in FIG. 1.

FIG. 2 is a top view of a secure plate used in the embodiment described in FIG. 1. As described in reference to FIG. 1, the secure plate 140 is coupled to the base plate 120 using a spring mechanism 146. In an embodiment, the secure plate 140 is provided with a holding part for example, a double-sided foam tape 144. One side of the double-sided tape 144 is fixed to a rigid surface 142 of the secure plate 140 and the other side of the tape 144 is attachable to the raw material when the secure plate 140 is elevated so the tape 144 contacts the raw material 110. The secure plate 140 is provided with holes 148 for accommodating the supports 130, such that the supports 130 pass through the holes 148 as the secure plate 140 is moved elevationally. While machining the components on the raw material 110 and during broaching, the supports 130 hold the raw material 110 and the components are provided with a plurality of lips for attaching the components to the raw material 110 and at this time the secure plate 140 will be in its lowered position. The lips may be removed by peripheral machining after securing the tape 144 to the components. The holes 148 in the secure plate 140 should correspond to the supports 130. The holes 148 in the base plate 140, the raw material 110 and the secure plate 140 should align with respect to each other for providing the support and facilitating a smooth guidance of the secure plate 140 as the secure plate is moved elevationally. However the holes or design of each of them can be modified or altered based on the component layout or component design.

Figure 3:
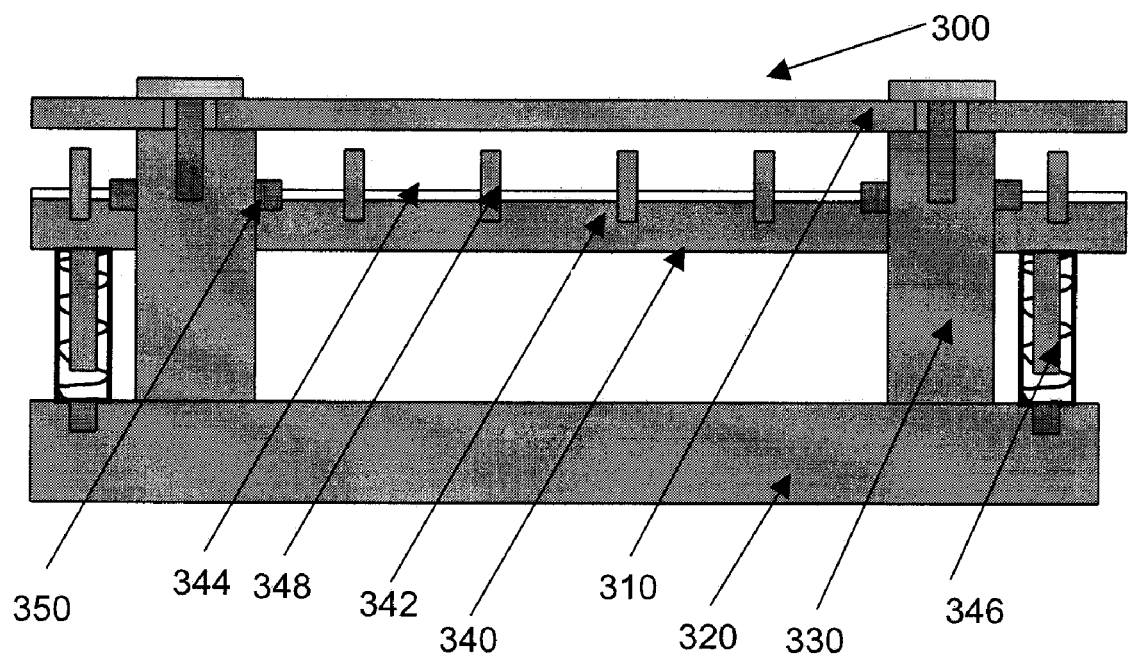
FIG. 3 is a side view of a holding mechanism as described in another embodiment of the invention.

FIG. 3 is a side view of a holding mechanism 300 as described in another embodiment of the invention. The holding mechanism 300 is provided with a base plate 320, a plurality of supports 330, and a secure plate 340. Initially the raw material 310 provided with sufficient holes may be selected for the machining process. The holes may be provided on the raw material 310 based on the support design using a CNC machine. The number of holes in the raw material 310 and their position should correspond to the number of supports 330 required to hold the raw material 310 while machining. The precision and position of the holes in the raw material 310 should be in alignment with the supports 330. One end of each support 330 is coupled to the base plate 320. The base plate 320 is rigidly fixed and the whole holding mechanism 300 is supported on the base plate 320. The base plate 320 is also provided with holes or projections to accommodate the supports 330, although the supports 330 may also be glued or otherwise affixed to the base plate 320 in other embodiments. A secure plate 340 is further provided with the base plate 310. One side of the secure plate 340 is provided with a rigid surface 342 and the other side is provided with at least one holding part. In an embodiment, the holding part includes a double-sided foam tape 344. The secure plate 340 is coupled to the base plate 320 using a spring mechanism 346, which includes one or more springs (two are shown in FIG. 3). The spring mechanism 346 allows the secure plate 340 to be released and secured easily. The secure plate 340 is further provided with a plurality of guiding pins 348. The structure, design and location of the guiding pins 348 correspond to the component lay out and the individual component size. When the secure plate 340 is elevated, the foam tape 344 will get affixed to the components on the raw material 310. However there could be a chance of tilting the components while machining as the tape 344 supports the component from the bottom. To hold the components rigidly during peripheral machining, the plurality of guiding pins 348 are provided on the secure plate 340. The position and design of the guiding pins 348 are selected such that one or more of the plurality of guiding pins 348 will go inside a cavity in each component to secure the same. The number of guiding pins 348 needed may depend on the component size or the rigidity requirement.

Figure 4:
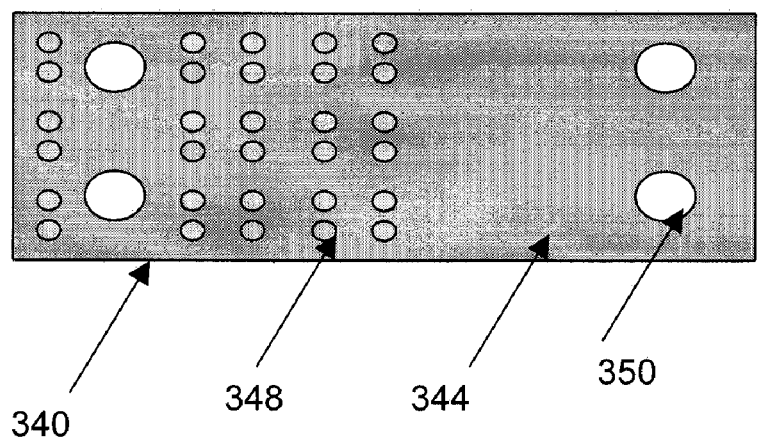
FIG. 4 is a top view of a secure plate used in the embodiment described in FIG. 3.

FIG. 4 is a top view of a secure plate 340 used in the embodiment described in FIG. 3. As described in reference to FIG. 3, the secure plate 340 is coupled to the base plate 320 using a spring mechanism 346. In an embodiment, the secure plate 340 is provided with a holding part for example, a double-sided foam tape 344. One side of the double-sided tape 344 is fixed to a rigid surface 342 of the secure plate 340 and the other side of the tape 344 is attachable to the raw material 310. The secure plate 340 is provided with holes 350 for accommodating the supports 330, with the supports 330 passing through the holes 350 so the secure plate 340 can move elevationally to and from the raw material 310. While machining the components on the raw material 310 and during broaching, the support holds the raw material 310 and the components are provided with a plurality of lips for attaching the components to the raw material 310. The lips may be removed by peripheral machining after securing the tape 344 to the components. The secure plate 340 is further provided with a plurality of guiding pins 348 to support the components while peripheral machining. The structure, design and location of the guiding pins 348 correspond to the component lay out and the individual component size. When the secure plate 340 is elevated, the foam tape 344 will get affixed to the components on the raw material 310. The holes 350 in the secure plate 340 should correspond to the supports 330, which need to be guided through the secure plate 340. The guiding pins 348 are tapered pins set at a defined pitch to locate exactly into the inner cavity of each component. Generally at least two pins are required to avoid rotation or vibration of each component. These pins impart the required rigidity and stiffness for achieving the tolerances and surface finish. The foam tape 344 prevents the components from lifting upwards, and causes the components to stick to the secure plate 340 after completely parting.

Figure 5:
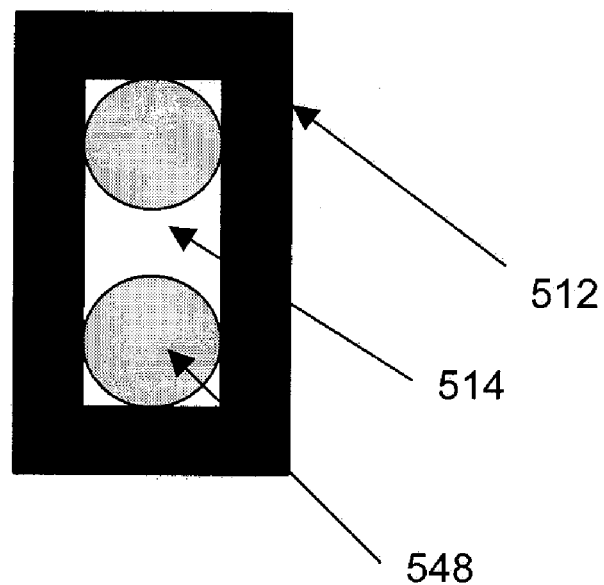
FIG. 5 is a top view of a component being held by a holding part as described in the embodiment shown in FIG. 3.

FIG. 5 is a top view of a component being held by a holding part as described in the embodiment shown in FIG. 3. The raw material 310 is machined to form a plurality of components 512 from a single sheet of material. The component 512 shown in the figure is of rectangular shape, but need not be limited so. The components 512 are defined based on the requirement. Each component 512 is normally provided with an internal cavity 514. The tolerance and precision of the cavity 514 is obtained by machining, broaching, grounding etc. In an embodiment illustrated in FIG. 3, a plurality of guiding pins 548 (such as guiding pins 348 in FIGS. 3 and 4) are provided for securing the component 512 during periphery machining. The components 512 are supported to the raw material through lips. While removing the lips the components need to be supported and hence a secure plate is used. The secure plate is provided with at least one of a holding part and in an example the holding part includes a double-sided adhesive tape. The secure plate is elevated before removing the plurality of lips and attached to the components from the bottom to support the components while removing the lips. In an embodiment the secure plates are provided with guiding pins 548, which get inserted into the cavity 514 of the component 512, while the lips are removed. The guiding pins 548 are tapered pins set at a defined pitch to locate exactly into the inner cavity 514 of the component 512. Generally at least two pins are required to avoid rotation or vibration of the component 512. These guiding pins 548 impart the required rigidity and stiffness for achieving the tolerances and surface finish. The foam tape prevents the components from lifting upwards and causes the components to stick to the secure plate after completely parting.

Figure 6:
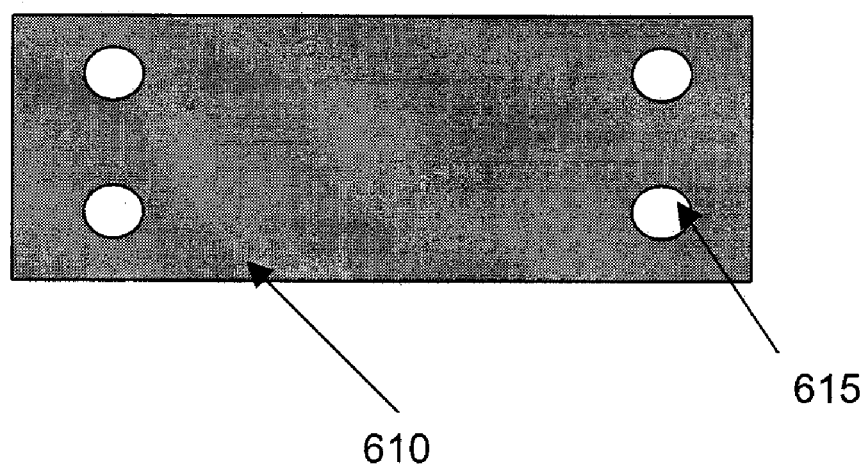
FIG. 6 is a top view of a raw material used in an embodiment of the invention.

FIG. 6 is a top view of a raw material used in an embodiment of the invention. The raw material 610 is sliced from the thick billet into the required component thickness size and grounded on a grinding machine to the required finish and tolerance. A number of components may be machined from a single large raw material. The raw material may be provided with a plurality of holes 615 to accommodate the supports. Alternately the supports may be designed according to the holes in the raw material. In any event the holes in the raw material for accommodating one end of each support should be in alignment with the holes provided on the base plate for accommodating the other end of the supports. The holes may be drilled in the raw material using a CNC machine or using any other technique. Once the raw material is supported by the support, it is machined to have a plurality of components. Each component is defined with an internal cavity, and a broaching tool that is used in association with a CNC machine achieves the tolerance of the internal cavity. For broaching the raw material, the raw material need not placed on a broaching machine, but rather broaching can be achieved using a CNC machine in association with a broaching tool. Thus the raw material need not be relocated for the broaching process. During machining and broaching the plurality of components are supported by lips provided on one or more sides or corners of the components. Each lip is an elongated member of raw material, which binds the component to the raw material. The components are machined leaving the lips to hold the components. Finally using the secure plate the components are individually held and the lips are removed. The individual components can then be removed from the raw material. In an example relating to ultrasound probes, the raw material used is graphite. However the holding mechanism design and process can be further implemented on various forms and types of materials.

Figure 7A:
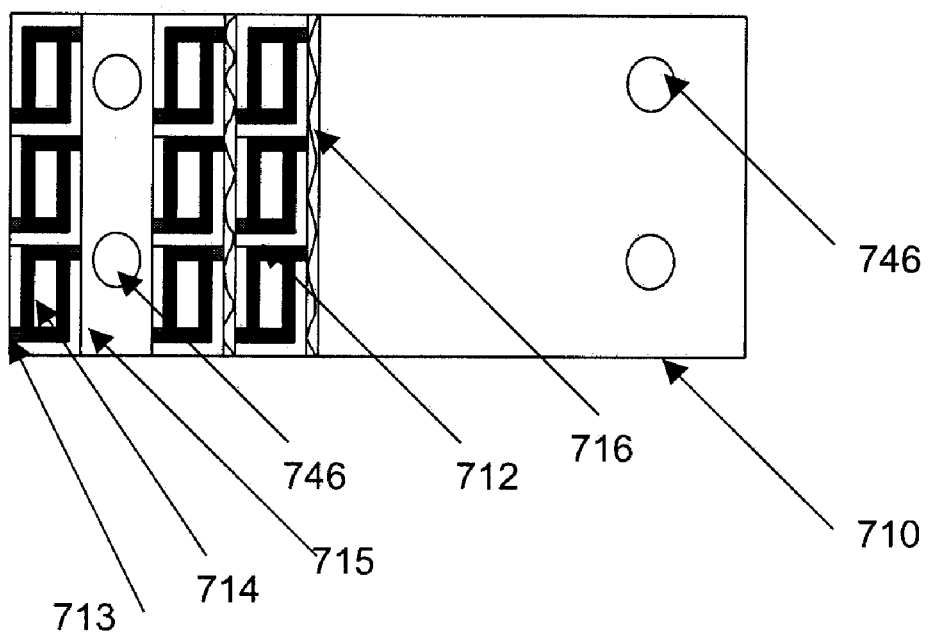
FIGS. 7A and 7B show top views of arrays of components arranged in a raw material in the different embodiments illustrated in FIGS. 1 and 3, respectively.
Figure 7B:
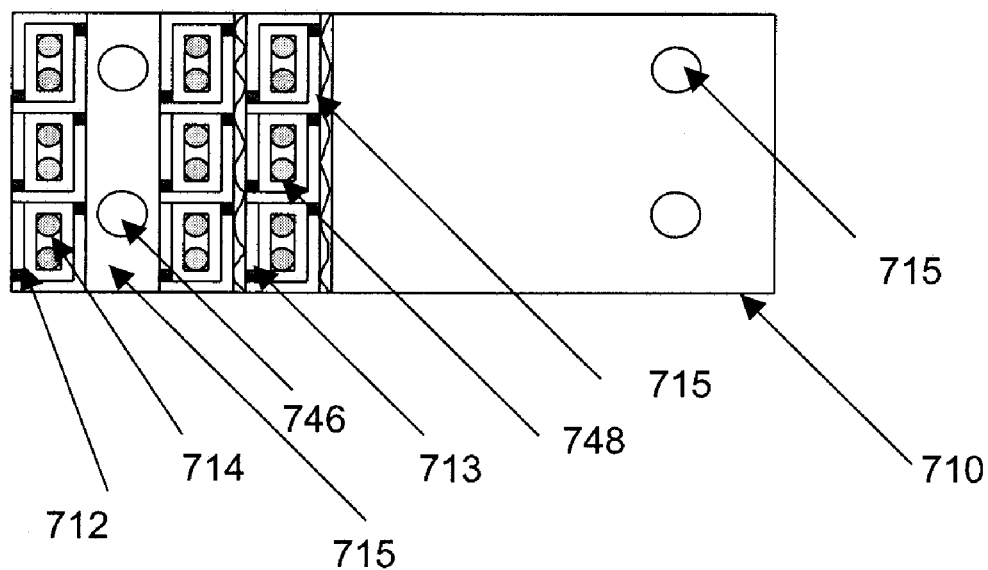

FIGS. 7A and 7B show top views of arrays of components arranged in a raw material in different embodiments illustrated in FIGS. 1 and 3 respectively. FIG. 7A illustrates the top view of an array of components secured to a foam tape as described in FIG. 1. A raw material 710 is scaled to provide a plurality of components 712. The raw material 710 is machined to have a plurality of holes 746 to accommodate the supports. The raw material is further designed to have ribs 715 for accommodating the holes 746. The ribs 715 will provide additional rigidity to the raw material. The support is provided in association with a base plate for supporting the raw material while machining the raw material. The raw material is machined to have a plurality of components 712 each having an inner cavity 714 and a plurality (e.g., two) of lips 713 for supporting each individual component to the raw material 710. Between the lips 713 as well, a plurality of ribs 716 are formed for providing rigidity to the raw material and to secure the components. The design, structure and need of these ribs depend on the component layout, component design, and the rigidity requirement.

FIG. 7B illustrates the top view of an array of components arranged in an embodiment wherein the secure plate is provided with a plurality of guiding pins as described in FIG. 3. The structure and design of the lay out is similar to that explained with reference to FIG. 7A. In addition, a plurality of guiding pins 748 is provided on the secure plate for holding the components. The FIG. 7B shows two guiding pins 748 inserted into the inner cavity of each component for holding the same. While peripheral machining the secure plate is being elevated and the tape is attached to the component for holding the same. Further the guiding pins are inserted into the components for ensuring enhanced support.

Figure 8:
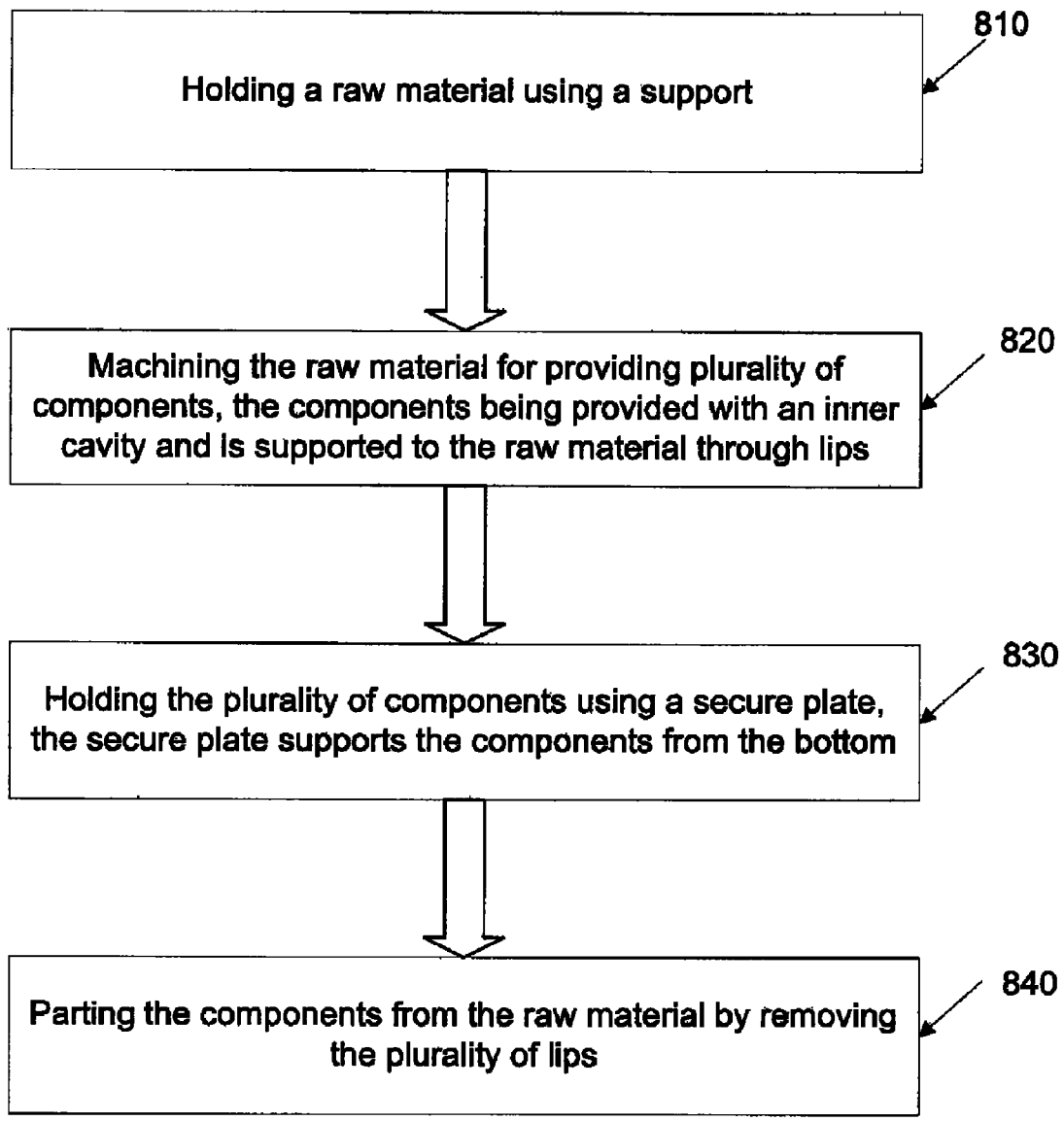
FIG. 8 is a high level flowchart depicting the steps of machining an array of components as described in an embodiment of the invention.

FIG. 8 is a high level flowchart depicting the steps of machining an array of components as described in an embodiment of the invention. At step 810, the raw material selected is held using a support. The raw material may be provided with holes for accommodating the support. The holes may be provided by machining using CNC machines or may be provided using some other techniques. At step 820, the raw material is machined to define plurality of components. The components are provided with an inner cavity. A plurality of components is scaled on a single raw material and each component is attached to the raw material through lips. The lips are elongated portion of the raw material that supports each individual component to the raw material. The components are machined with required accuracy and tolerance using different machining process. At step 830, the components are hold by a secure plate. The secure plate is provided on a holding mechanism that is used to hold the raw material. The secure plate is provided with a foam tape that can get attached to the component for supporting the plurality of components from the bottom. At step 840, plurality of lips associated with each component is removed, so that the components are completely separated from the raw material.

Figure 9:
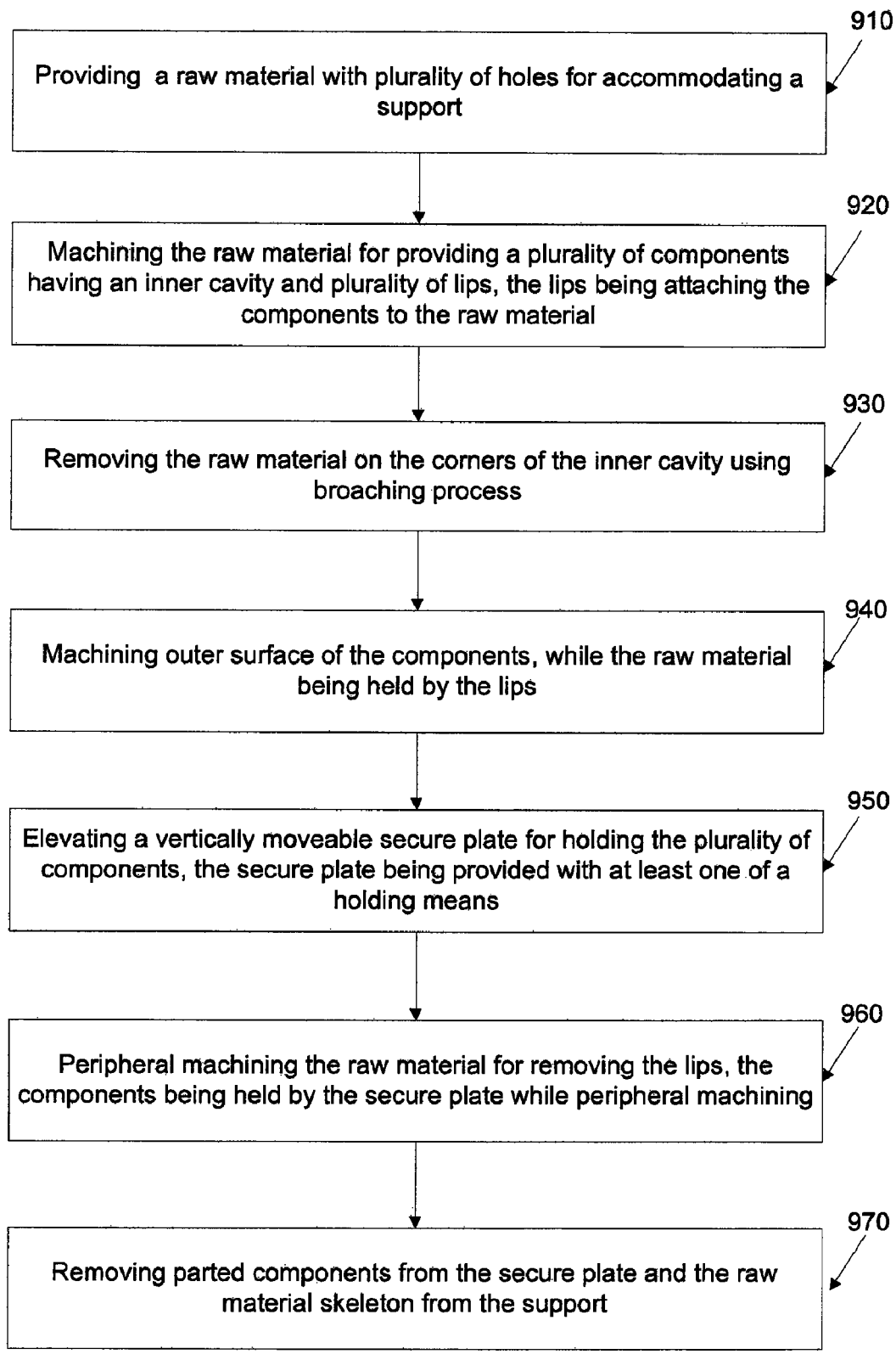
FIG. 9 is a flowchart describing, in greater detail, exemplary steps of manufacturing of an array case using the aspects of the present technique illustrated in FIG. 8.

FIG. 9 is a flowchart describing, in greater detail, exemplary steps of manufacturing of an array case using the aspects of the present technique illustrated in FIG. 8. At step 910, a raw material is provided with plurality of holes for accommodating the support. The support is provided on a fixed base to support the raw material while machining the same. The raw material may be machined using a CNC machine or any other technique to provide necessary holes on based on the design and structure of the support. The number of holes may depend on the component lay out design and the rigidity of the raw material. The holes should be in alignment with the holes that are provided on the base surface where one end of the support is located. At step 920, the raw material is machined to define plurality of components. The components are provided with an inner cavity. A plurality of components is scaled on a single raw material and each component is attached to the raw material through lips. The lips are elongated portion of the raw material that supports each individual component to the raw material. The components are machined with required accuracy and tolerance using different machining process. At step 930, the raw material inside the cavity removed by the broaching process. To accomplish the broaching process, the raw material needs to be held in air so that the broaching tool can pass through the inner cavity. A broaching tool associated with the CNC machine can achieve the broaching. This will help to maintain the raw material at the same position even while broaching. This will provide better tolerance and accuracy. At step 940, the components are surface machined to get the required component size and tolerance. During this time the components are being held to the raw material by plurality of lips associated with the components. At step 950, a secure plate provided with a base surface is elevated to get attached to the plurality of components. The secure plate is provided with a holding part for holding the plurality of components. The holding part will support the raw material from the bottom. Also the secure plate may be provided with guiding pins for inserting into the inner cavity of the components for rigidly holding the same. At step 960, plurality of lips is removed from the components, thereby separating the plurality of components from the raw material. The components may be separated from the lips by peripheral machining. At step 970, the separated components are being removed from the foam tape and the raw material skeleton may be removed from the support. This completes the machining process.

Some of the advantages of the invention include increased productivity and consistency of CNC machines. As the components or the raw material is placed in a fixed position during the whole machining process, the efficiency and accuracy of the process increases. As the position of the raw material remains constant, the tolerance depends only on the CNC machine. The holding mechanism is simple in design, easy to manufacture and implement in the existing machines. One common holding mechanism can be used for different component layouts, with minor modifications.

Thus various embodiments of the invention describe a holding mechanism and a machining process for CNC machines. Also in an embodiment the invention achieves the broaching process using a broaching tool associated with the CNC machine. Further the invention achieves a method of optimization of CNC machines.

While the invention has been described with reference to preferred embodiments, those skilled in the art will appreciate that certain substitutions, alterations and omissions may be made to the embodiments without departing from the spirit of the invention. Accordingly, the foregoing description is meant to be exemplary only, and should not limit the scope of the invention as set forth in the following claims.

I claim:

1. A process of manufacturing an array case for an ultrasound probe, comprising:
(a) providing a raw material with a plurality of holes for accommodating a plurality of supports;
(b) machining a plurality of components having an internal cavity and a plurality of lips, wherein the lips attach the components to the raw material;
(c) removing the raw material on the corners of the internal cavity using a broaching process;
(d) machining outer surface of the components, while the lips hold the components to the raw material;
(e) elevating a vertically-moveable secure plate for holding the plurality of components, the secure plate being provided with at least one holding part; and
(f) peripheral machining the raw material for removing the lips, the components being held by the secure plate during the peripheral machining.

2. A process as in claim 1, wherein the step of providing the raw material includes machining holes in the raw material corresponding to the supports.

3. A process as in claim 1, wherein the step of providing the raw material further comprises: holding the raw material using the plurality of supports, the supports being attached to a rigid base plate.

4. A process as in claim 1, wherein the step of machining the plurality of components comprises: defining a component layout design, the plurality of components being grounded and sized into required component size.

5. A process as in claim 1, wherein the step of removing the raw material from the corners of the inner cavity comprises removing the raw material using a broaching tool associated with a CNC machine.

6. A process as in claim 1, wherein the step of elevating the secure plate comprises: elevating the secure plate to attach one side of a double-sided foam tape to the raw material, the other side of the foam tape being attached to a rigid surface of the secure plate.

7. A process as in claim 1, wherein the step of elevating further comprises: inserting at least one guiding pin within at least one component of the plurality of components, the at least one guiding pin being provided on the secure plate.

8. A process as in claim 1, wherein the plurality of components are held in a fixed position while machining, broaching and peripheral machining.

9. A process as in claim 1, wherein the at least one holding part of the secure plate holds the plurality of components during the peripheral machining.

10. A process as in claim 1, wherein the lips attach the plurality of components to at least one rib of the raw material.

* * * * *